United States Patent Office 3,482,122
Patented Dec. 2, 1969

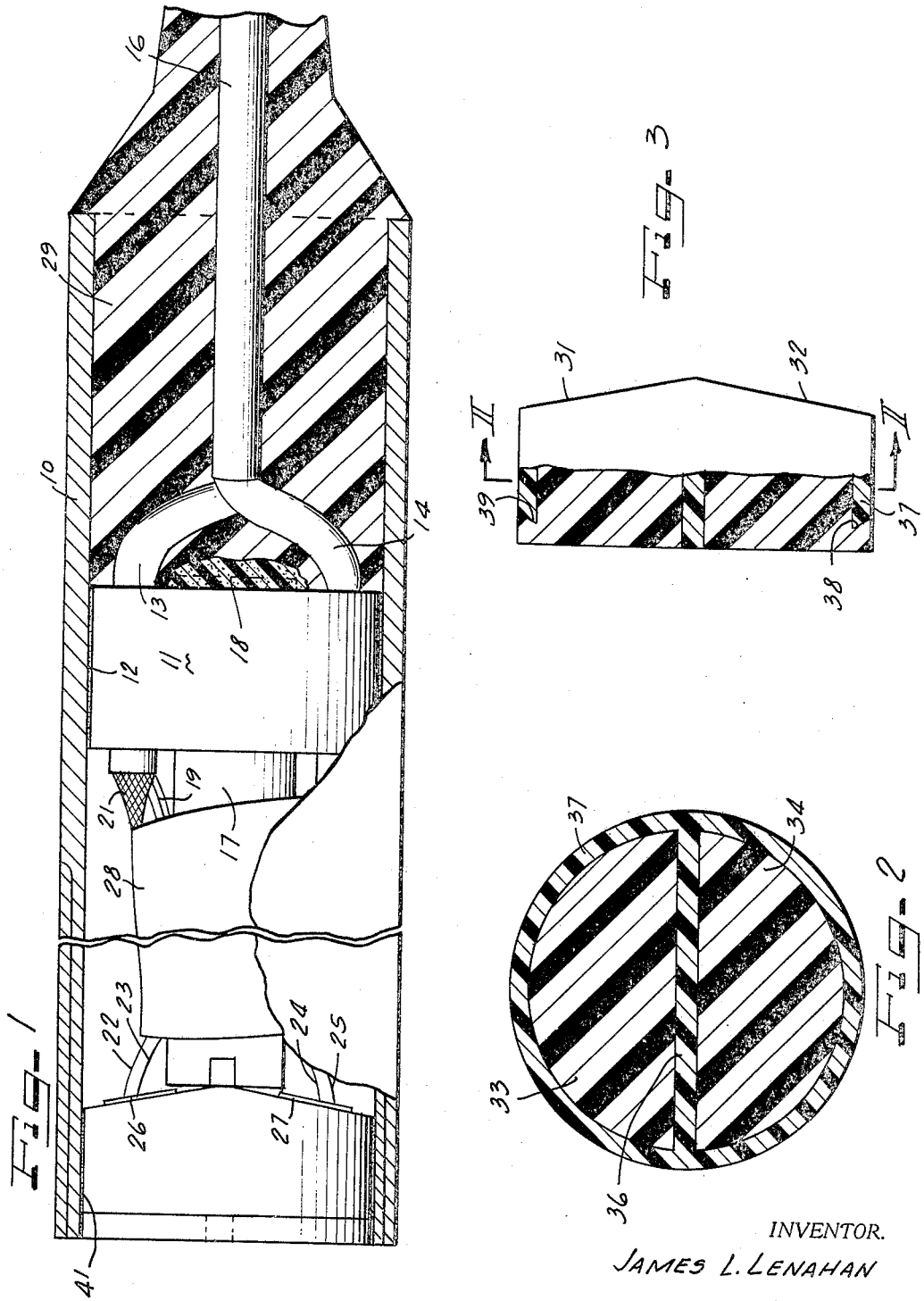

3,482,122
ANGLE BEAM TRANSDUCER
James L. Lenahan, Glenview, Ill., assignor to Magnaflux Corporation, Chicago, Ill., a corporation of Delaware
Filed Mar. 6, 1967, Ser. No. 621,072
Int. Cl. H04r 17/00
U.S. Cl. 310—9.1                                      8 Claims

ABSTRACT OF THE DISCLOSURE

Ultrasonic angle beam transducer unit wherein the electro-acoustical transducer elements are secured to a coupling medium including a cross-linked styrene copolymer which has improved acoustical properties for this use.

BACKGROUND OF THE INVENTION

Field of the invention

The present invention is in the field of transducer elements for ultrasonic equipment of the type used, for example, in flaw detection and for medical purposes.

Flaw detection with ultrasonic assemblies has been highly developed over the past several decades. Initially, inspection was made by directing a supersonic wave into the part under test at right angles to the surface, but this suffered from the difficulty that a series of standing waves would be caused by the repeated reflection of the wave from the surfaces of the part, and these standing waves interfered with the waves which arrived at the detector crystal.

More recently, ultrasonic assemblies of this type have employed angle beam transducers, wherein a pair of electroacoustical elements such asc piezoelectric crystals are mounted on surfaces of a support known as a wedge, the support surfaces being at a slight angle with respect to each other so that this problem of standing waves is eliminated.

The acoustical coupling material of which the wedge is made is usually a synthetic resin of the acrylic family, such as methacrylate and methyl methacrylate polymers ("Lucite" and "Plexiglas"). These materials are adequate at lower frequencies in that the velocity of sound in these polymers is considerably different from the velocity of sound in the parts under test. These materials are heat-resistant, tough, insoluble in most solvents and durable. They suffer from the disadvantage that at higher frequencies, they significantly attenuate the propagation of the ultrasonic waves. For practical purposes, because of the adsorptive characteristics of these materials, it is generally considered that a frequency of 5 megacycles, is the practical limit for their use, and the losses are severe at this frequency.

Description of the prior art

Some techniques used in ultrasonic flaw detection processes embodying the angular beam concept will be found in patents such as U.S. Patents Nos. 2,527,986 and 2,592,134. To my knowledge, there is no prior art on the subject of using the types of polymers here involved in the particular environment of the present invention.

SUMMARY OF THE INVENTION

The transducer units of the present invention are of the beam angle type in which the electro-acoustical elements are secured to a coupling medium consisting of a cross-linked styrene co-polymer, a thermosetting resin which is used in its as cast condition. These types of resins are commercially available but heretofore their use has been confined to that of dielectric materials in electromagnetic wave propagation. I have found that materials of this type have all of the advantages of the previously used acrylic polymers and in addition exhibit an attenuation which is of several orders of magnitude less at 5 megacycles than the attenuation characteristic of the acrylic polymers.

Preferably, the ultrasonic transducer consists of an elongated body having a pair of angularly disposed faces at one end thereof, the body being composed of the cross-linked styrene co-polymer with an electro-acoustical transducer such as a crystal coupled to each of the angularly disposed faces to provide a pair of electro-acoustical transducer units. Suitable dampening means is incorporated into the unit between the transducer units and, in the particularly preferred form of the invention, the dampening means is continuous about the electro-acoustical transducer units and serves to secure the units together.

BRIEF DESCRIPTION OF THE DRAWING

FIGURE 1 is an enlarged view, partly broken away, of a transducer assembly embodying the improvements of the present invention;

FIGURE 2 is a cross-sectional view of the wedge assembly, taken substantially along the line II—II of FIGURE 3; and FIGURE 3 is a view of the wedge assembly partly in elevation and partly in cross-section.

DESCRIPTION OF THE PREFERRED EMBODIMENTS

Shown in the drawing is a transducer assembly intended to be used at a frequency of about 5 megacycles as a probe operating on Doppler effects. The transducer assembly includes a hollow outer tube 10 in which there is disposed a bushing 11 cemented to the casing 10 by means of a layer of cement 12. A pair of coaxial conductors 13 and 14 extend from a coaxial cable 16 and are held in place within the bushing 11. A tube 17 consisting of paper impregnated with a resin such as a phenolic resin is positioned within the bushing 11 and is held therein by a deposit of silicone rubber 18. The center conductors 19 and the cable shields 21 of the respective coaxial conductors are connected to leads 22, 23, 24 and 25 extending to a pair of electro-acoustical transducers such as piezoelectric crystals 26 and 27. One or more layers of shielding foil 28 are wound around the connections.

The coaxial cable 16 is held in place in the casing 10 by means of a deposit of potting resin 29 which may be an epoxy resin or the like. The coaxial cable 16 is provided with connectors (not shown) for connection to a high frequency oscillator.

The crystals 26 and 27 are mounted on angularly disposed faces 31 and 32 of a wedge element best illustrated in FIGURES 2 and 3 of the drawing. The degree of inclination of the faces 31 and 32 has been exaggerated in FIGURES 1 and 3 for purposes of clarity, since the usual inclination is a matter of only a few degrees or so.

The acoustical coupling elements in the wedge assembly shown in FIGURES 2 and 3 consist of a pair of semi-cylindrical blocks 33 and 34 of a cross-linked styrene co-polymer, preferably a thermosetting cross-linked co-polymer of styrene and divinyl benzene.

Dampening between the two units is provided by a damping material having a web portion 36 extending between the opposed flat faces of the blocks 33 and 34 and a tubular portion 37 extending about the entire periphery of the blocks 33 and 34. As best indicated in FIGURE 3, the blocks 33 and 34 are undercut as indicated at 38 and 39 so that the tubular portion 37 is flush with the outer periphery of the blocks 33 and 34. The damping material preferably consists of a mixture of heavy metal particles such as tungsten particles with a resinous binder such as an epoxy resin. Since the resin extends substantially completely around the periphery of the blocks 33 and 34, it serves to rigidly secure the blocks in spaced relation. The entire wedge assembly is then secured to the interior of the casing 10 by means of a layer of cement 41. A particularly preferred material for use in the wedge assemblies of the present invention is that marketed by the Brand-Rex Division of American Enka Corporation under its trademark "Rexolite 1422." This material has been used as a dielectric for high frequency electromagnetic radiation assemblies such as radar, but I have found that its acoustical properties make it particularly suitable for use as an acoustical coupling element in an ultrasonic transducer. The velocity of sound in this material is similar to that in "Lucite" and in addition, the cross-linked styrene co-polymer is very tough, abrasion-resistant, impact-resistant, heat-resistant, colorless, readily machinable and substantially insoluble in ordinary solvents. Other physical properties of the material are listed in the following table:

TABLE

| | |
|---|---|
| Dielectric constant at 10 mc.–10 gc. | 2.53 |
| Dissipation factor at 1 mc. | .00012 |
| Volume resistivity (ASTM D–257) ohm-cm. | $>10^{16}$ |
| Surface resistivity (ASTM D–257) ohms | $>10^{14}$ |
| Specific gravity (ASTM D–792) | 1.05 |
| Tensile strength, p.s.i. | 7000 |
| Flexural strength, p.s.i. | 11.500 |
| Impact strength (ASTM D–256) ft. lb./inch of notch | 0.3 |
| Coefficient of linear thermal expansion, per ° C. | $7 \times 10^{-5}$ |
| Thermal conductivity, cal./sec./cm.$^2$/° C./cm. | $3.5 \times 10^{-4}$ |

It was found that such material operated satisfactorily at a frequency of 5 megacycles, whereas device employing a wedge made out of acrylic resins would not.

It should be evident that various modifications can be made to the described embodiments without departing from the scope of the present invention.

I claim as my invention:

1. In an ultrasonic transducer a crystal capable of generating ultrasonic waves and a wedge mechanically coupled thereto, said wedge comprising a cross-linked styrene co-polymer.

2. The transducer of claim 1 in which said wedge is composed of a cross-linked co-polymer of styrene and divinyl benzene.

3. The transducer of claim 1 in which said copolymer is in the cast condition.

4. In an ultrasonic transducer, an elongated body having a pair of angularly disposed faces at one end thereof, said body being composed of a cross-linked styrene copolymer, an electro-acoustical transducer coupled to each of said angularly disposed faces to provide a pair of electro-acoustical transducer units, and dampening means between said transducer units.

5. The transducer of claim 4 in which said dampening means consists of a mixture of heavy metal particles and a resinous binder.

6. The transducer of claim 4 in which said dampening means is continuous about said electro-acoustical transducer units and serves to secure said units together.

7. The transducer of claim 6 in which the electro-acoustical transducer units are relieved about their peripheries and said dampening means is received in the relieved areas.

8. The transducer of claim 4 in which said metal particles are tungsten particles.

References Cited

UNITED STATES PATENTS

| 2,628,335 | 2/1953 | Drake | 73—67.7 |
| 2,748,369 | 5/1956 | Smyth | 310—9.6 |
| 2,784,325 | 3/1957 | Halliday | 73—67.7 |
| 2,972,068 | 2/1961 | Howry | 310—8.2 |
| 3,112,414 | 11/1963 | Yando | 310—803 |
| 3,121,326 | 2/1964 | Klatchko | 73—67.7 |
| 3,132,510 | 5/1964 | Buchan | 73—67.7 |
| 3,220,248 | 11/1965 | Wood | 73—67.7 |
| 3,363,117 | 1/1968 | Mondot | 310—8.2 |
| 3,379,902 | 4/1968 | Harris | 310—8.3 |
| 3,393,331 | 7/1968 | Puckett | 310—8.7 |

J. D. MILLER, Primary Examiner

U.S. Cl. X.R.

73—71.5; 310—8.1, 8.3, 8.6